United States Patent
Dean et al.

(10) Patent No.: US 10,406,768 B2
(45) Date of Patent: Sep. 10, 2019

(54) METHOD AND APPARATUS FOR MANUFACTURING CONTACT LENS MOULDS

(71) Applicant: CooperVision International Holding Company, LP, St. Michael (BB)

(72) Inventors: Gregg A. Dean; Colin Ball, West End (GB)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

(21) Appl. No.: 15/561,989

(22) PCT Filed: Aug. 25, 2016

(86) PCT No.: PCT/GB2016/052644
§ 371 (c)(1),
(2) Date: Sep. 27, 2017

(87) PCT Pub. No.: WO2017/037428
PCT Pub. Date: Mar. 9, 2017

(65) Prior Publication Data
US 2018/0169980 A1   Jun. 21, 2018

(30) Foreign Application Priority Data
Aug. 28, 2015   (GB) .................................. 1515399.2

(51) Int. Cl.
*B29D 11/00*   (2006.01)
*B23B 31/30*   (2006.01)
(Continued)

(52) U.S. Cl.
CPC ........ *B29D 11/0048* (2013.01); *B23B 31/307* (2013.01); *B23Q 3/067* (2013.01);
(Continued)

(58) Field of Classification Search
CPC .... B23Q 3/088; B23Q 3/067; B24B 13/0025; B24B 13/0052; B29D 11/00038; B29D 11/0048; B29D 11/00942; B23B 31/307
See application file for complete search history.

(56) References Cited

U.S. PATENT DOCUMENTS 4,455,901 A * 6/1984 Council, Jr. ........... B23Q 17/20
                                              200/16 B
4,565,348 A * 1/1986 Larsen ............. B29D 11/00057
                                              249/122
(Continued)

FOREIGN PATENT DOCUMENTS

GB       2503037 A     12/2013
WO   2010062520 A2      6/2010

OTHER PUBLICATIONS

International Search Report and Written Opinion issued in corresponding International Patent Application No. PCT/GB2016/052644 dated Oct. 28, 2016 (9 pages).
(Continued)

*Primary Examiner* — Sara Addisu
(74) *Attorney, Agent, or Firm* — Kilyk & Bowersox, P.L.L.C.

(57) ABSTRACT

A collet (230) for holding a contact lens mold half (240) during machining of a surface of the mold half (240) having a disc (235) having a face and defining:
  a central structure (250a), at the center of the face, for receiving a head portion (240a) of the mold half (240), and
  an elongate recess (250b), in the face, for receiving a tail portion (240b) of the mold half (240), the elongate recess (250b) extending from the central structure (250a) along a radius of the disc (235).

13 Claims, 3 Drawing Sheets

(51) Int. Cl.
    *B23Q 3/06*     (2006.01)
    *B24B 13/00*    (2006.01)
    *B23Q 3/08*     (2006.01)
    *B24B 13/005*   (2006.01)

(52) U.S. Cl.
    CPC .... *B24B 13/0025* (2013.01); *B29D 11/00038* (2013.01); *B29D 11/00942* (2013.01); *B23Q 3/088* (2013.01); *B24B 13/0052* (2013.01)

(56) References Cited

U.S. PATENT DOCUMENTS

| | | | | |
|---|---|---|---|---|
| 4,584,148 A * | 4/1986 | Rawlings | ............... | B23B 29/04 264/2.1 |
| 4,924,739 A * | 5/1990 | Ademovic | ............ | B24B 13/0025 249/117 |
| 5,931,068 A * | 8/1999 | Council, Jr. | ............ | B23Q 3/084 82/1.11 |
| 6,068,464 A * | 5/2000 | Su | ...................... | B29C 31/006 249/117 |
| 6,555,029 B1 * | 4/2003 | Ruscio | ............ | B29D 11/00932 264/1.1 |
| 2003/0062640 A1 * | 4/2003 | Ansell | ................ | B29C 33/3842 264/1.32 |
| 2007/0007733 A1 * | 1/2007 | Hogarth | ............... | B23B 31/307 279/3 |
| 2007/0036878 A1 * | 2/2007 | Goodenough | ... | B29D 11/00038 425/542 |
| 2010/0109176 A1 * | 5/2010 | Davison | ........... | B29D 11/00009 264/2.5 |
| 2010/0270694 A1 * | 10/2010 | Meyers | .................. | B23B 31/10 264/2.7 |
| 2017/0297282 A1 * | 10/2017 | Oag | .................. | B29D 11/0048 |
| 2018/0236737 A1 * | 8/2018 | Dean | ................ | B29D 11/00125 |

OTHER PUBLICATIONS

Demand filed Jun. 26, 2017 in corresponding International Patent Application No. PCT/GB2016/052644 (7 pages).
International Preliminary Report on Patentability issued in corresponding International Patent Application No. PCT/GB2016/052644 dated Jul. 24, 2017 (13 pages).

\* cited by examiner

METHOD AND APPARATUS FOR MANUFACTURING CONTACT LENS MOULDS

This application is a National Stage Application of PCT/GB2016/052644, filed Aug. 25, 2016, which claims priority to United Kingdom Patent Application No. 1515399.2, filed Aug. 28, 2015.

FIELD

This invention relates to the field of contact lens manufacture. In particular, the invention provides a collet for holding a contact lens mold half during machining of a surface of the mold half and a method of machining a surface of a contact lens mold half using the collet.

BACKGROUND

Various methods of manufacturing contact lenses are known, including spin casting, machining (for example by diamond turning), and cast molding (for example, using injection molded mold halves). Cast molding of contact lenses involves forming a pair of mold halves (i.e., a first mold half and a second mold half), placing a volume of a contact lens formulation on an optical quality surface of one of the two mold halves, and placing the two mold halves in contact with each other to form a contact lens mold assembly that has a contact lens-shaped cavity containing the contact lens formulation. The contact lens mold assembly is then exposed to conditions to cause the contact lens formulation to polymerize or cure in the contact lens mold assembly.

Contact lenses providing common prescriptions, for example to correct myopia, hyperopia or astigmatism, are mass-produced in very large numbers, at least for low to moderate lens powers. However, it is not economical to produce very large numbers of contact lenses for prescriptions that are less common; contact lenses have only a limited shelf life, so large numbers cannot be produced and stored until they are needed. A preferred approach is to provide such lenses on a "made-to-order" basis.

One approach to producing a made-to-order lens is to cast-mold the lens in a contact lens mold assembly in which at least one of the mold halves includes a surface that has been machined to provide a shape suitable for a desired prescription. For example, WO2010062520A2, describes injection-molded ophthalmic lens mold halves that are subsequently machined to have customized optical quality lens-defining surfaces for producing customized ophthalmic lenses.

US 2007/0036878 A1 is an example of a document describing contact lens mold halves having a "pan-handle" shape; that is, mold halves having a circular head portion and an elongate tail (or "handle") portion. The circular head portion includes a concave or convex surface which co-operates with a corresponding convex or concave surface of another mold half to form a contact-lens-shaped cavity in which a contact lens is to be cast. The elongate tail portion is useful for handling the mold half and can be used for other purposes, for example to receive a label in order to identify the mold half. The pan-handle contact lens mold halves described in US 2007/0036878 A1 each have both a concave and a convex lens-forming surface, both of which can form contact-lens-shaped cavities in co-operation with adjacent mold halves, but pan-handle contact lens mold halves are envisaged in which only one such lens-forming surface is provided.

During machining, the mold half is rotated at high speed and a cutting tool is brought into contact with the surface of the mold half, with the high-speed rotation resulting in material being cut away by the tool. The optical surface is provided with a customized shape by moving the cutting tool relative to the surface whilst the mold half is rotating. The cut-away material, referred to as "swarf" typically falls away from the cut surface, or is sucked and/or blown away.

However, when attempting to machine a pan-handle contact lens mold half, problems can arise. In particular, the elongate tail portion (i.e. the handle of the pan handle), being part of the mold half, rotates at high speed, in a propeller-like manner. Swarf can readily become entangled with the elongate tail portion, and can then interfere with the cutting process, causing damage to the mold half.

SUMMARY

Briefly and in general terms, the present invention provides apparatus directed towards improving lens manufacturing in approaches employing machining a surface of a contact lens mold half.

A first aspect of the invention provides a collet for holding a contact lens mold half during machining of a surface of the mold half, the collet comprising a disc having a face and defining:
  a central structure, at the centre of the face, for receiving a head portion of the mold half, and
  an elongate recess, in the face, for receiving a tail portion of the mold half, the elongate recess extending from the central structure along a radius of the disc.

A second aspect of the invention provides a lathe for machining a surface of a contact lens mold half, the lathe comprising a headstock and a carriage, wherein the headstock carries a collet according to the first aspect.

A third aspect of the invention provides a method of manufacturing a contact lens, the method comprising machining a surface of a contact lens mold half whilst the contact lens mold half is retained in the collet of the first aspect.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

An embodiment will now be described, by way of example only, with references to the accompany drawings.

DETAILED DESCRIPTION

Figure 1:
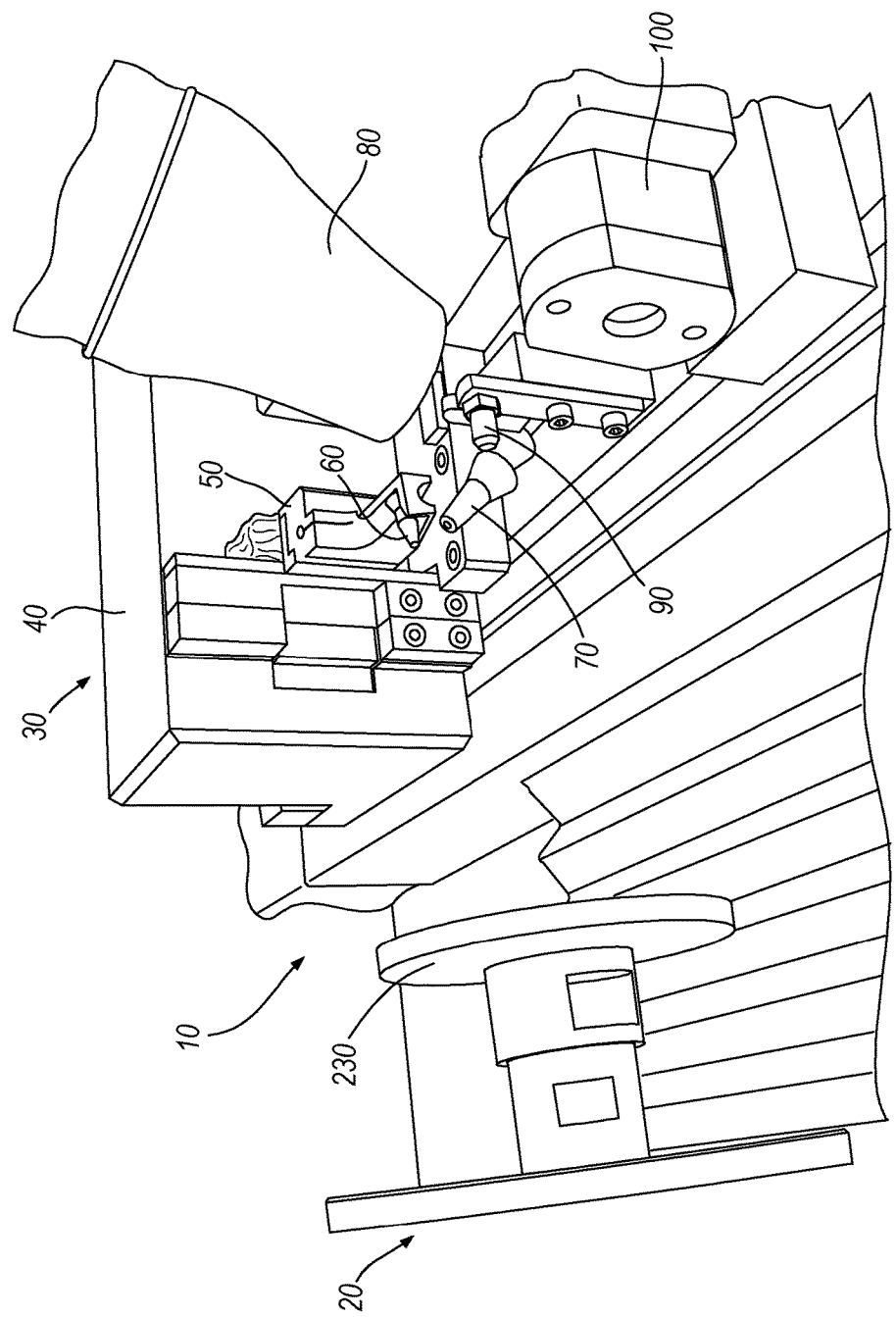
FIG. 1 is a lathe including a headstock carrying a collet.

Embodiments are described herein in the context of improving lens manufacturing in approaches employing machining a surface of a contact lens mold half.

Those of ordinary skill in the art will realize that the following detailed description is illustrative only and is not intended to be in any way limiting. Other embodiments of the present invention will readily suggest themselves to such skilled persons having the benefit of this disclosure. Reference will be made in detail to implementations as illustrated in the accompanying drawings. The same reference indicators will be used throughout the drawings and the following detailed description to refer to the same or like parts.

As previously stated, the first aspect is directed to a collet for holding a contact lens mold half during machining of a surface of the mold half. The collet comprises a disc having a face. The collet defines a central structure, at the centre of the face, for receiving a head portion of the mold half, and an elongate recess, in the face, for receiving a tail portion of the mold half. The elongate recess extends from the central structure along a radius of the disc.

Optionally, the central structure is a recess. Optionally, the central structure is a protrusion.

Optionally, the elongate recess is shaped and sized to receive the entire length, or substantially the entire length, of the tail portion of the mold half.

Optionally, the disc defines a void sized and positioned to balance the elongate recess when the disc is rotated. Optionally, the balancing void is aligned with, but on the opposite side of the central structure from, the elongate recess.

Optionally, the balancing void is a recess on the front or rear the surface of the disc.

Optionally, the balancing void is a cylinder, for example a cylinder of circular cross-section. Optionally, the balancing void is a slot or groove extending circumferentially around part of the disc.

Optionally, the disc also defines a peripheral slot to facilitate removal the contact lens mold half from the recesses.

Optionally, the disc also defines a hole in, for example a hole at the centre of, the central structure.

Optionally, the collet includes a tubular stock for insertion into a chuck of a lathe and for application of a vacuum to the hole.

As previously stated, the second aspect is directed to a lathe for machining a surface of a contact lens mold half, the lathe comprising a headstock and a carriage, wherein the headstock carries a collet according to the first aspect.

Optionally, the collet carries a panhandle contact lens mold half having a circular head portion and an elongate tail portion.

Optionally, the elongate recess has a depth less than the depth of the mold half.

Optionally, the panhandle mold is retained in the collet by application of a vacuum. Optionally, the collet comprises a stock and the vacuum is applied via the stock, for example via a passage in the stock to a central hole in the collet. Optionally, the headstock comprises a chuck and the vacuum is applied through the chuck.

Alternatively or additionally, the panhandle mold may be retained in the collet using wax.

Optionally, the carriage carries a first translation stage providing lateral movement relative to the longitudinal axis of the headstock a second translation stage providing longitudinal movement, along or parallel to the longitudinal axis of the headstock, and a cutting tool carried on the first or second translation stage.

Optionally, the carriage carries a blowing nozzle, which blows air to clear away swarf during cutting. Optionally, the carriage carries a sucking nozzle, which sucks away swarf during cutting.

Optionally, the headstock includes a rotationally driven chuck which carries the collet.

As previously stated, the third aspect is directed to method of manufacturing a contact lens, the method comprising machining the surface of a contact lens mold half whilst the contact lens mold half is retained in the collet of the first aspect.

The machining will typically be lathing.

Optionally, the surface being machined is a surface that will form an optical surface of a contact lens to be cast using the mold half. Optionally, the optical surface is an aspheric surface.

With reference to the drawings, an example machining apparatus 10 (FIG. 1) comprises a headstock 20, having a rotating internal spindle (not visible in FIG. 1), and a carriage 30. The headstock 20 carries a collet 230. The carriage 30 carries a Y-translation stage 40, providing horizontal lateral movement relative to the longitudinal axis of the headstock 20, which in turn carries an X-translation stage 50, providing longitudinal movement, along or parallel to the axis of the headstock 20. The X-translation stage 50 carries a cutting tool 60. Thus, the cutting tool 60 can be moved backwards and forwards towards the headstock 20, using the X-translation stage 50, and side-to-side in front of it, using the Y-translation stage 40. The cutting tool 60 is mounted so that it cuts at the height of the spindle of the headstock 20.

The carriage 30 also carries a blowing nozzle 70, which blows air to clear away swarf during cutting, and a sucking nozzle 80, which simultaneously sucks away swarf. The carriage 30 also carries a proximity sensor 90, calibrated to identify the position of the collet 230 and a laser 100 for precision etching of contact lens mold halves.

Figure 2:
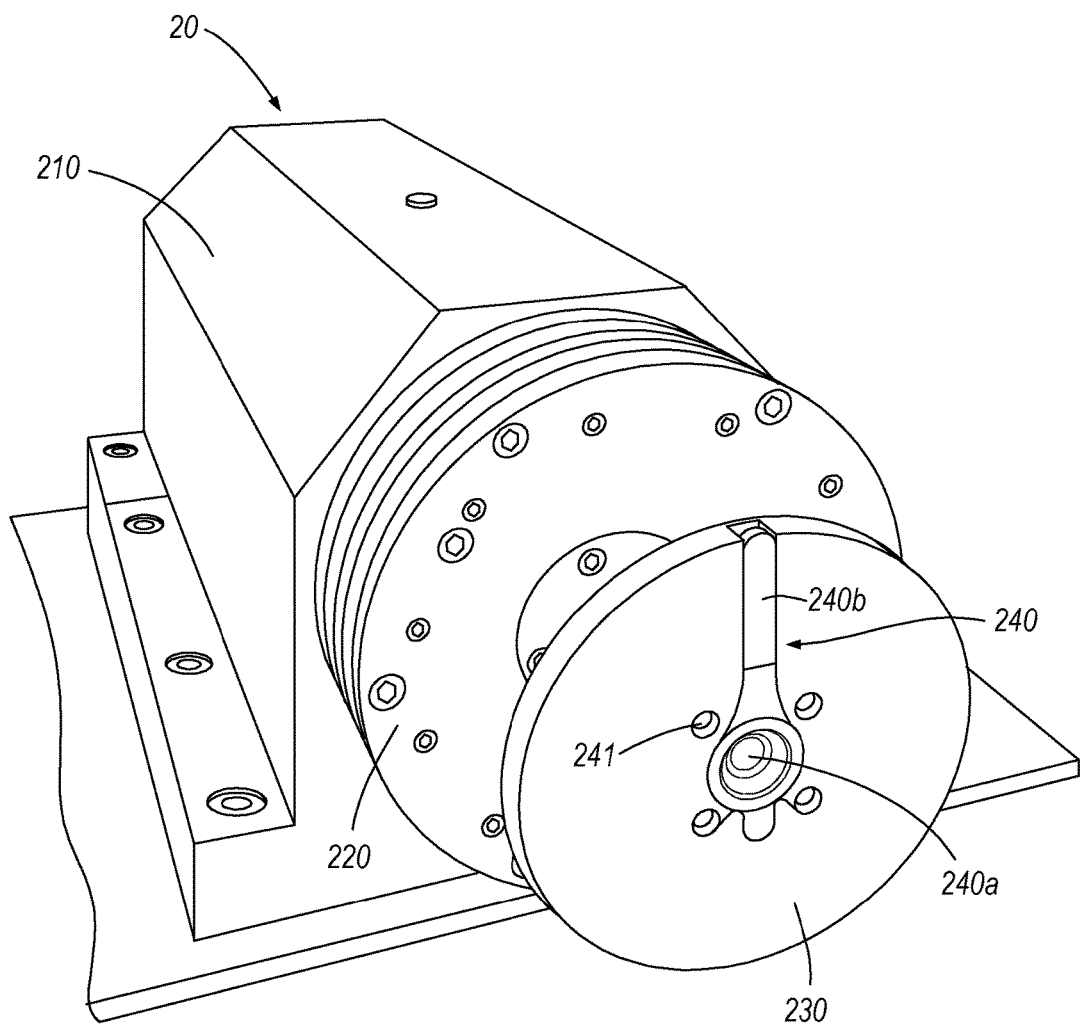
FIG. 2 is the headstock of FIG. 1 in more detail.

The headstock 20 (FIG. 2) includes a housing 210 surrounding the spindle (not shown), a chuck 220, which is rotationally driven by the spindle and which carries the collet 230. The collet 230 carries a panhandle contact lens mold half 240 having a circular head portion 240a and an elongate tail portion 240b. (The circular head portion 240a is configured to mate with a complementary circular head portion (not shown) to form a cavity in which a contact lens is formed by curing, as described above.)

The structure of the collet 230 will now be described in more detail with reference to the embodiment of FIGS. 3A and 3B.

The collet 230 includes a disc 235 that defines a mold-half-shaped recess 250 (FIG. 3A) having approximately the shape of a panhandle contact lens mold half 240. The mold-half-shaped recess 250 has a depth slightly less than the corresponding depth of the mold half 240: it is sufficiently deep to retain the mold half, but is as shallow as is otherwise possible, to minimize its unbalancing effect on the collet 230. The mold-half-shaped recess 250 has a circular recess 250a for receiving the head portion 240a of the contact lens mold half 240 and an elongate recess 250b for receiving the tail portion 240b of the mold half 240. (The elongate recess 250b also includes a slot 255, which receives a protruding element of the mold half 240, which is provided on the mold half 240 to improve stacking of mold halves.)

The disc 235 also defines a central hole 250c, at the centre of the circular recess 250a and a peripheral slot 270 to facilitate removal the contact lens mold half 240 from the recess 250.

The disc 235 also defines a circular balancing recess 260, aligned with, but on the opposite side of the central hole 250c from, the tail portion 250b. (The embodiment of FIGS. 1 and 2 does not include the circular balancing recess 260. The embodiment of FIGS. 1 and 2 does include four assembly screws 241 which are not required in the collet of FIGS. 3A-3B.)

Figure 3A:
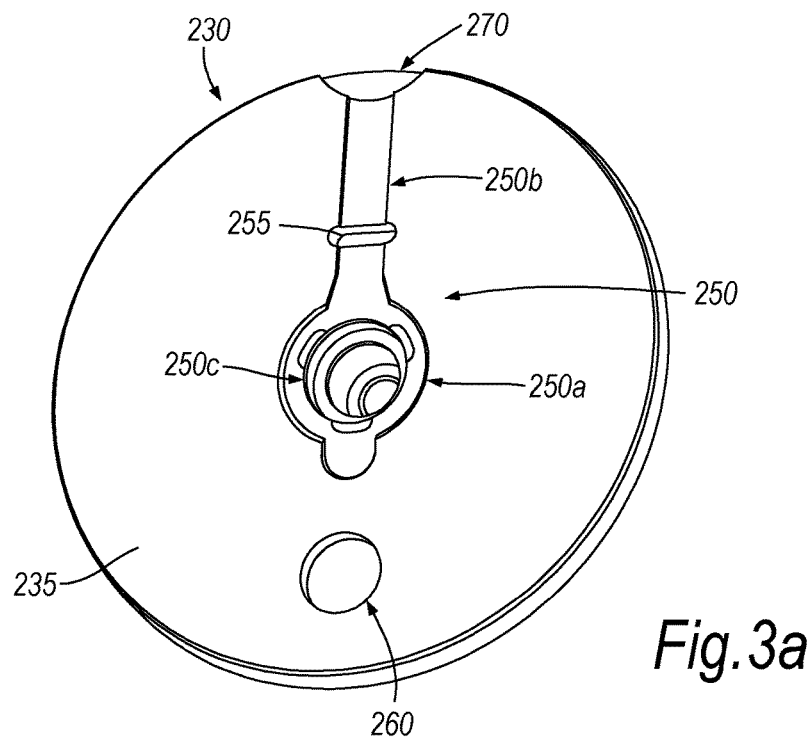
FIG. 3A is a front perspective view and FIG. 3B is a rear perspective view of another example collet.
Figure 3B:
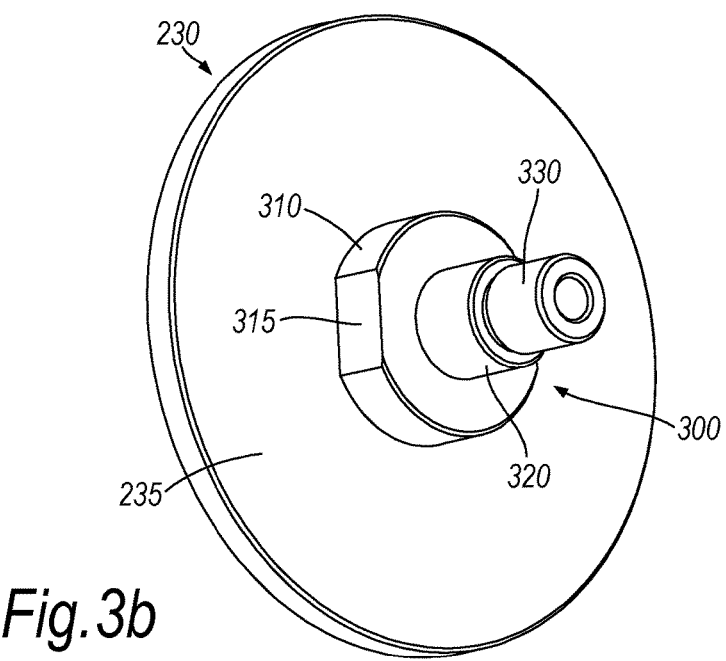

At its rear FIG. 3B, the collet 230 includes a stock 300 for insertion into the chuck 220, by means of which the collet 230 is carried and rotated in the headstock 20. The stock 300 consists of three sleeve portions 310, 320, 330, located at the centre of the disc 235, each of substantially circular cross section. The sleeve portion 330 extends farthest from the disc 235 and has an outer diameter smaller than that of the next sleeve portion 320, which in turn has an outer diameter smaller than that of the sleeve portion 310 extending least far from the disc 235. The sleeve portion 310 is truncated to form a flat portion 315.

The three sleeve portions 310, 320, 330 define a passage from the central hole 250c to the chuck 22. The mold half 240 is retained in the mold-shaped recess 250 by a vacuum applied through the chuck 22 via the passage to the central hole 250c.

While the present disclosure has been described and illustrated with reference to particular embodiments, it will be appreciated by those of ordinary skill in the art that the disclosure lends itself to many different variations not specifically illustrated herein.

For example, whilst the mold half 240 is held in the collet 230 by a vacuum in the example of FIGS. 3A-3B, in alternative embodiments the mold half 240 may be held in the collet 230 by a different mating approach, for example using wax.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A collet for holding a contact lens mold half during machining of a surface of the mold half, the collet comprising a disc having a face and defining:
   a central structure, at the center of the face, for receiving a head portion of the mold half, and
   a recess, in the face, for receiving a tail portion of the mold half, the recess extending from the central structure along a radius of the disc;
   wherein the recess is elongate and shaped and sized to receive substantially the entire length of the tail portion of the mold half.

2. The collet of claim 1, wherein the disc defines a void sized and positioned to balance the elongate recess when the disc is rotated.

3. The collet of claim 2, wherein the balancing void is a recess in the surface of the disc.

4. The collet of claim 1, wherein the central structure is a recess.

5. The collet of claim 1, wherein the central structure is a protrusion.

6. The collet of claim 1, wherein the disc defines a hole in the central structure and the collet includes a tubular stock for insertion into a chuck of a lathe and for application of a vacuum to the hole.

7. A lathe for machining a surface of a contact lens mold half, the lathe comprising a headstock and a carriage, wherein the headstock carries a collet for holding a contact lens mold half during machining of a surface of the mold half, the collet comprising a disc having a face and defining:
   a central structure, at the center of the face, for receiving a head portion of the mold half, and
   a recess, in the face, for receiving a tail portion of the mold half, the recess extending from the central structure along a radius of the disc;
   wherein the recess is elongate and shaped and sized to receive substantially the entire length of the tail portion of the mold half.

8. A lathe as claimed in claim 7, wherein the collet carries a panhandle contact lens mold half having a circular head portion and an elongate tail portion.

9. A lathe as claimed in claim 8, wherein the elongate recess has a depth less than the depth of the mold half.

10. A lathe as claimed in claim 7, in which the panhandle mold is retained in the collet by application of a vacuum.

11. A method of manufacturing a contact lens, the method comprising machining a surface of a contact lens mold half whilst the contact lens mold half is retained in a collet for holding a contact lens mold half during machining of a surface of the mold half, the collet comprising a disc having a face and defining:
   a central structure, at the center of the face, for receiving a head portion of the mold half, and
   a recess, in the face, for receiving a tail portion of the mold half, the recess extending from the central structure along a radius of the disc;
   wherein the recess is elongate and shaped and sized to receive substantially the entire length of the tail portion of the mold half.

12. A method as claimed in claim 11, in which the surface being machined is a surface that will form an optical surface of a contact lens to be cast using the mold half.

13. A method as claimed in claim 12, in which the optical surface is an aspheric surface.

* * * * *